J. GREENWOOD.
Hangers for Shaftings.

No. 142,100.

Patented August 26, 1873.

UNITED STATES PATENT OFFICE.

JOHN GREENWOOD, OF ROCHESTER, NEW YORK.

IMPROVEMENT IN HANGERS FOR SHAFTING.

Specification forming part of Letters Patent No. 142,100, dated August 26, 1873; application filed August 8, 1873.

*To all whom it may concern:*

Be it known that I, JOHN GREENWOOD, of Rochester, in the county of Monroe, in the State of New York, have made certain Improvements in Hangers for Shafting, of which the following is a specification:

The object of this invention being to insure safety and security to an adjustable hanger that supports shafting, and so that the lines of shafting may be in any angle to the perpendicularity of the hanger, or the shafting may be in a line diagonal or oblique to the plane of the sides of the supporting-plate of the hanger; and it consists in the construction and arrangement of the parts whereby the object is attained.

Figure 1:
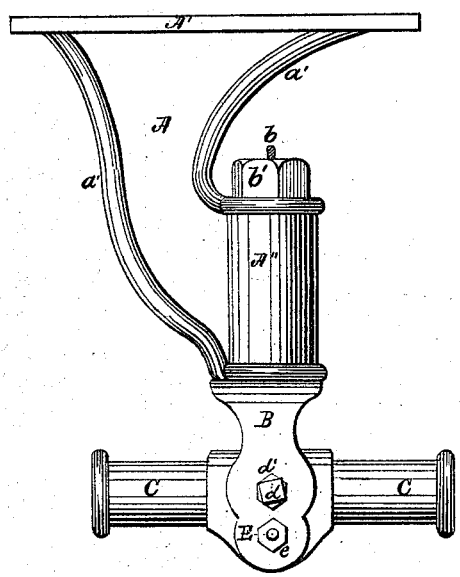
Figure 2:
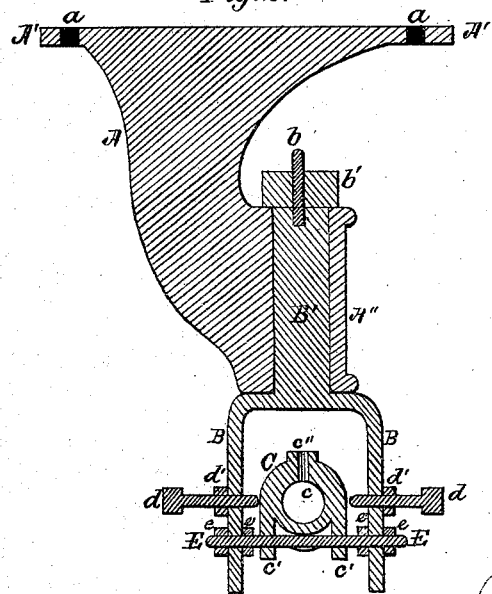

In the drawings, Figure 1 represents a side view of the hanger, and Fig. 2 a sectional view of same, with the position of the supporting-fork and bearing changed from that seen in Fig. 1.

A represents the body of the hanger, having the supporting-plate A', with bolt-holes, $a$, through it to bolt it to a beam, joist, or other fixed part of a building, and flanges $a'$, for strengthening the body A'', with a vertical hole through it to receive the axle of a supporting-fork. B is the fork that supports the shafting in a box or bearing between the legs thereof. This fork is so constructed that it has two legs separated from and parallel to each other at their lower ends and far enough apart to admit of the journal-box in which the shafting revolves, and temper or clamping screws that confine the journal-box in position, as well as the transverse screw-bolt that sustains the journal-box in the fork, and prevents the legs of the fork from spreading. B' is the axle or pivot of that part of the fork that passes through a hole in part A'' of the hanger A, and is secured therein by means of the screw $b$ and nut $b'$ in such manner as that the fork B, with the journal-box, may be turned in either direction horizontally, and when in the exact position desired the screw-nut $b'$ is turned down hard on part A'', and clamps the fork B to be immovable. C is a journal-box or bearing, in which is a hole, $c$, to receive the shaft, and has ears $c'$ $c'$ extending downward to receive the transverse bolt through holes in such ears, and upon such bolt the box or bearing will pivot or turn. $c''$ is an oil-hole to oil the shaft in its bearings. $d$ $d$ are temper or holding screws, screw-tapped through the legs of the fork, and so that their inner ends can bear loosely against the opposite sides of the journal-box C, and allow it to turn upon the transverse or supporting bolt or pin, and keep the box in its lateral position. $d'$ $d'$ are jam-nuts to turn against the legs of the fork and hold the screw $d$ from turning back and loosen their hold upon the box C. E is a transverse screw-bolt passing through the legs of the fork and through the holes in the ears $c'$, so that it holds the journal-box C from longitudinal motion, and prevents the legs of the fork from spreading when the temper-screws $d$ are turned hard against the journal-box, but allows the journal-box to turn upon it. $e$ $e$ are screw-nuts that screw upon the ends of the transverse screw-bolt E, and hold the legs of the fork against the pressure or strain upon said legs by the temper-screws $d$. $e'$ $e'$ are jam-nuts that may be used when necessary to preserve the parallelism of the legs of the fork.

Having thus described my invention, what I claim, and desire to secure by Letters Patent, is—

1. The screw-bolt E, when used in combination with the journal-box C and fork B, substantially as and for the purpose described.

2. The combination of the hanger A, pivoted fork B, journal-box C, temper-screws $d$, and transverse screw-bolt E, constructed and arranged to operate in the manner and for the purpose substantially as described.

JOHN GREENWOOD.

Witnesses:
JOSEPH A. EASTMAN,
M. VAN VOORHIS.